United States Patent [19]
Van der Kolk

[11] 3,788,773

[45] Jan. 29, 1974

[54] HYDRAULIC CONTROL AND REGULATING APPARATUS FOR AN ADJUSTABLE PUMP

[75] Inventor: Hans-Jurgen Van der Kolk, Sersheim, Germany

[73] Assignee: Robert Bosch GmbH, Stuttgart, Germany

[22] Filed: Aug. 18, 1972

[21] Appl. No.: 281,727

[30] Foreign Application Priority Data
Aug. 20, 1971 Germany.......................... 2141724

[52] U.S. Cl.................. 417/213, 417/217, 60/444
[51] Int. Cl............................................ F04b 49/00
[58] Field of Search...... 417/213, 222, 217; 60/427, 60/450, 444

[56] References Cited
UNITED STATES PATENTS

| | | | |
|---|---|---|---|
| 3,127,745 | 4/1964 | Young................................. | 60/444 |
| 3,152,445 | 10/1964 | Weisenbach.......................... | 60/450 |
| 3,214,911 | 11/1965 | Kempson.............................. | 60/450 |
| 3,477,225 | 11/1969 | Cryder et al.......................... | 60/444 |
| 3,672,166 | 6/1972 | Isaac..................................... | 60/450 |
| 3,164,960 | 1/1965 | Weisenbach et al.................. | 60/427 |

Primary Examiner—William L. Freeh
Attorney, Agent, or Firm—Michael S. Striker

[57] ABSTRACT

A hydraulic control and regulating apparatus for an adjustable pump driven by a prime mover, preferably a combustion motor, in which an auxiliary pump delivers fluid through a throttle producing at a predetermined speed of the auxiliary pump corresponding to the speed of the motor, a pressure differential operating a control valve to supply to, and discharge from, hydraulic setting motors which operate a manual lever controlling the position of the volume regulator of the adjustable pump. The flow of fluid to the hydraulic setting motor is controlled by a manually operated lever shifting two reversing valves for connecting the speed control valve with the delivery conduit of the auxiliary pump and with an open low pressure space.

11 Claims, 1 Drawing Figure

PATENTED JAN 29 1974　　　　　　　　　　　　　　　　　　　　3,788,773
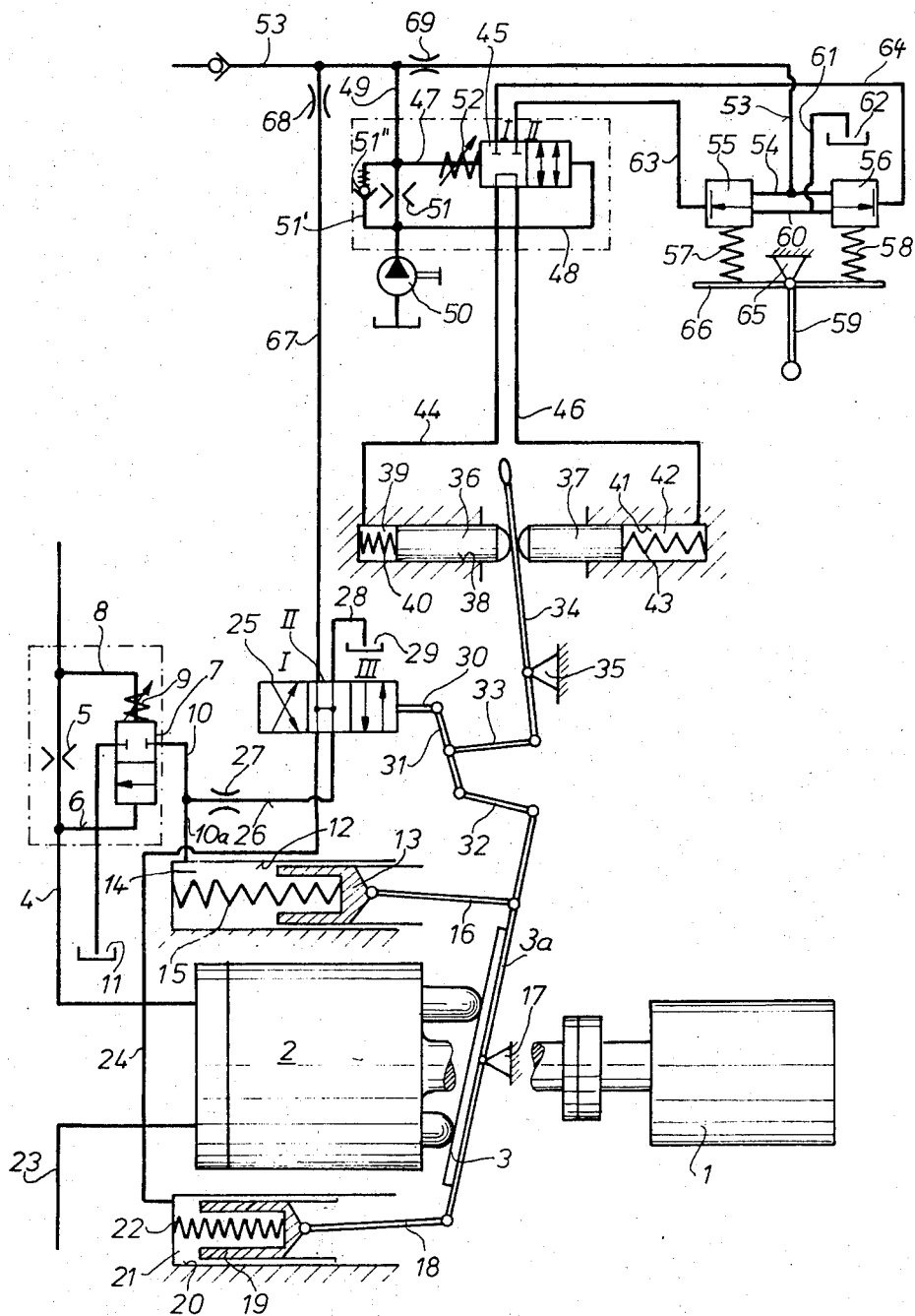

HYDRAULIC CONTROL AND REGULATING APPARATUS FOR AN ADJUSTABLE PUMP

BACKGROUND OF THE INVENTION

The present invention relates to a control and regulating apparatus for an adjustable pump driven by a combustion engine. The apparatus includes an auxiliary pump driven proportional to the adjustable pump, and delivering fluid into a regulating circuit. In apparatus of this type, the eitire pumped fluid flows through a throttle, and the pressure differential produced at the throttle is used for limiting the turning moment or torque required by the adjustable pump to prevent stalling of the combustion motor.

In the British Pat. No. PS 1,067,612, an apparatus of this type is disclosed to be used for the hydrostatic transmission of a vehicle. By a manual operation, the transmission ratio, and also the drive torque of the combustion motor is determined. entire arrangement prevents a stalling of the combustion motor under an overload, but has the disadvantage of a complicated structure. Furthermore, the power of the combustion engine can frequently not be fully utilized.

The German Pat. No. PS 1,286,863 discloses a hydrostatic transmission in which a measuring means for measuring the number of revolution is provided on the combustion motor, and controls at the maximum critical rotary speed of the motor, a regulator which adjusts the pump of the hydrostatic transmission in such a manner that the combustion engine is relieved. The apparatus is expensive due to the use of a speed measuring device, and cannot prevent stalling of the combustion motor in the lower range of numbers of revolution.

SUMMARY OF THE INVENTION

It is an object of the invention to provide a control and regulating apparatus which has a simple construction, and protects the combustion motor from an overload in the lower speed range.

Another object of the invention is to automatically adjust the adjustable pump when the combustion motor operates under conditions which may cause stalling.

In accordance with the invention, a pressure differential produced by a throttle in the high pressure output conduit of an auxiliary pump, actuates a control valve biassed by a spring. The control valve is connected with shifting valve means actuated by a manually operated lever, and serving for finally setting the volume displaced by the adjustable pump. On the other hand, the control valve is also connected with hydraulic setting means for the regulator by which the adjustable pump is adjusted.

The apparatus of the invention is particularly suitable for combustion motors which are regulated depending on the load, for example, an Otto motor with carburator, and can be easily controlled from a remote location. It is particularly advantageous to provide a linkage which is on the one hand connected with the regulator of the pump, for example a wobble plate of an axial piston pump, and on the other hand is connected with another control valve which controls the flow of fluid to and from the operating means of the regulator of the adjustable pump, such as a wobble plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a schematic view, partially in section, illustrating an embodiment of a control and regulating apparatus in accordance with the invention.

DESCRIPTION OF THE PREFERRED EMBODIMENT

A prime mover 1, preferably a combustion motor, drives an adjustable and reversible axial piston pump 2, having a plurality of pistons abutting a wobble plate 3. A high pressure conduit 4 is connected with the outlet of the adjustable pump 2, and is provided with a throttle 5 which creates a pressure differential between conduits 6 and 8 which are connected to chambers, not shown, at opposite ends of a valve cylinder of a discharge valve 10, which includes a valve slide having a normal position in which a discharge conduit 10 is interrupted, and an operative position in which the discharge conduit 10 is connected by discharge valve 7 as indicated by an arrow to discharge into a low pressure container 11. A spring 9 biases discharge valve 7 into the illustrated position interrupting discharge conduit 10. However, if the volume of fluid in the outlet conduit 4 is increased, the pressure differential created by the throttle 5 causes shifting of the valve slide against the action of spring 9 to a discharge position connecting conduit 10.

Conduit 10, together with a conduit 67 is connected by a conduit 10a with a chamber 14 in a cylinder 12 in which an operating piston 13 is mounted for sliding movement, biassed by spring 15 located in chamber 14. Piston 13 is connected by a link 16 with a pivot on the support lever 3a of the wobble plate 3. The other end of lever 3a is pivotally connected with a rod 18 articulated to an operating piston 19 slidably guided in a cylinder bore 20 and forming in cylinder bore 19 a chamber 21 in which a spring 22 is located for urging operating piston 19 out of cylinder 20. The adjustable pump 2 has an inlet 23 for applying suction to a liquid located in a low pressure container, not shown, or connected with the outlet of a hydraulic motor.

A conduit 24 is connected with the chamber 21, and leads to an adjustment control valve 25 which has three positions I, II, III. A conduit 24 connects the cylinder 20 and chamber 21 with a port in adjustment control valve 25. The chamber 14 of cylinder bore 12 is connected by a conduit 10a with conduit 10 and a conduit 26 which also opens in a port of control valve 25. Another port of control valve 25 is connected by a discharge conduit 28 with the open container 29. A further port is connected with a conduit 67 ending in a conduit 53 which is connected by conduit 49 with an auxiliary pump 50.

A linkage 30, 31, 32 connects the control valve 25 with the adjustable wobble plate 3. The link 31 is articulated to a rod 33 articulated to one end of a manually operated lever 34 which is mounted on a stationary pivot 35.

The manually operated lever 34 can be displaced to shift adjustment control valve 25 from the inoperative normal position II to one of the two operative positions I and III. Two setting pistons 36 and 37, respectively located in cylinders 38 and 41, abut the manually operated lever 34 from opposite sides. Piston 36 forms a pressure chamber 39 in which a spring 40, acting on piston 36, is disposed. Piston 37 forms a pressure chamber 41 in which a spring 43, acting on piston 37, is disposed. The pistons 36 and 37 are coaxial.

Cylinder bore 38 and chamber 39 are connected by a conduit 44 with a speed control valve 45 which has two positions I and II. The cylinder bore 41 and chamber 42 are connected by conduit 46 with another port of control valve 45. The ends of the valve cylinder 48 of control valve 45 are connected with conduits 47 and 48 so that the valve slide of control valve 45 can be shifted. The two conduits 47 and 48 are connected with a delivery conduit 49 into which an auxiliary pump 50 discharges fluid. In a portion of conduit 49 located between conduits 47 and 48, a throttling means 51 is arranged. Parallel to throttle means 51, a conduit 51' with a check valve 51'' is provided, the check valve opening in the flow direction of the fluid discharged by auxiliary pump 50. A regulating spring 52 acts on the valve slide of control valve 45 in the same direction as the fluid pressure. It is preferred to use an adjustable throttling means 51'.

The conduit 49 is connected with another conduit 53 which leads to the low pressure inlet of a hydraulic motor, and is connected with a conduit 54 to which two shifting valves 55, 56 are connected. Valves 55, 56 can be operated by an adjusting lever 59 pivotable about a stationary pivot 65 and carrying a plate 66 acting on two springs 57 and 58 which respectively operate shifting valves 55 and 56 when lever 59 is manually turned in one or the opposite direction.

Shifting valves 55, 56 are connected by conduits 60, 61 with a low pressure container 62. Shifting valves 55 and 56 are connected by conduits 63 and 64 with ports of control valve 45.

Conduit 53 is connected by conduit 67 with the adjustment control valve 25. A throttle 68 is provided in conduit 67, and a throttle 69 is provided in conduit 53 downstream of conduit 49.

Manually operated lever 34 and manually operated lever 59 are operatively connected so that lever 34 is displaced proportionally to lever 59 when the same is angularly displaced. Manual lever 34 directly mechanically controls the adjustment of pump 2, and hydraulically controls the adjustment by means of control valve 25 and operating pistons 13 and 19.

Assuming that the adjustment control valve 25 is in the neutral position II, as shown in the drawing, the two pressure chambers 14 and 21 of the cylinders 12 and 20 are connected with each other and with a low pressure container 29. Consequently, no pressure prevails in the chambers 14 and 21, so that the springs 15, 22 are effective to place the operating pistons 13, 19, in a neutral position in which the angle of the wobble plate 3 is perpendicular to the axis of pump 2 so that the pistons of pump 2 are not operated and no fluid is discharged from conduit 4.

Assuming that adjusting lever 34 is angularly displaced about the stationary pivot 35, for example in counterclockwise direction, the adjustment control valve 25 is operated by the linkage 30, 31, 33 to assume the control position I, while the pivot 17 acts as a stationary fulcrum for the link 3a. Pressure fluid discharged by the auxiliary pump 50 flows through the delivery conduits 67, 26 and throttle 27 into the pressure chamber 14 of operating cylinder 12 so that operating piston 13 is moved out of cylinder 12 and acts through link 16 on link 3a to place the wobble plate 3 in a slanted position, while operating piston 19 is moved into cylinder 20 to reduce the volume of chamber 21. The fluid in chamber 21 is displaced through conduits 24, 28 to the container 29.

When a manually operated adjusting lever 34 is turned in clockwise direction out of its neutral position II, the adjustment control valve 25 assumes the control position III, so that pressure fluid can flow into the chamber 21, causing an angular displacement of wobble pate 3 opposite to the displacement described above. In other words, when the manual adjusting lever 34 is turned in opposite directions about pivot 35, wobble plate 3 is turned in opposite direction about pivot 17.

When the volume of fluid displaced by pump 2 exceeds the predetermined volume, the pressure differential between conduits 6 and 8 on opposite sides of throttle 5 becomes so great, that discharge valve 7 is moved against the action of spring 9 to an open position so that fluid can flow from pressure chamber 14 through conduit 10 to the low pressure container 11 so that the pressure prevailing in chamber 21 of cylinder 20, adjusts the position of wobble plate 3 to reduce the angle of the wobble plate with the axis of pump 2. However, it should be noted that this regulation of the volume displaced by pump 2, is effective only in one direction of flow of pump 2.

The auxiliary pump 50 is driven by drive means, not shown, at a speed which is proportional to the speed of pump 2 and of the prime mover motor 1. Consequently, when the rotary speed of the motor 1 reaches a predetermined maximum, the volume of fluid displaced and delivered by the auxiliary pump 50 becomes so great that the differential pressure produced at opposite sides of throttle 51, is sufficient to shift the valve slide, not shown, of the speed control valve 45 to the control position II out of the normal inoperative position I. Depending on the position selected for the manually operated lever 59, one of the shifting valves 55, 56 has been opened by the action of the plate 66 on the respective spring 57 or 58. Assuming that shifting valve 55 has been opened, the fluid delivered by auxiliary pump 50 flows through conduits 53 and 54, 63, 46 into the pressure chamber 42 of cylinder bore 41, and displaces setting piston 37 or setting piston 36. Pressure fluid in chamber 39 is displaced through conduits 44, 64 and shifting valve 56, and also through conduit 61 into the low pressure container 62. Due to the shifting of piston 37, manual lever 34 is angularly displaced, and displaces the links 31, 3a, 18 and 16 of the adjusting means for the adjustable pump 2, as described above, so that pressure fluid flows out of one of the pressure chambers 14 or 21 whereby the wobble plate 3 is adjusted to an angular position determined by manually operated lever 59 of second adjusting means which include the shifting valves 55, 56.

It follows that the adjustment of pump 2 by manual lever 34 can be overruled by the operations of speed control valve 45 with throttle 51 and spring 52, so that the combustion motor 1 is protected from overload and stalling.

When manual adjusting lever 59 is angularly displaced, one of the shifting valves 55, 56 is placed in a position in which the conduit 53 connected with auxiliary pump 50 is on the one hand connected with one of the chambers 39, 43, or relieves the pressure in these chambers 39, 43 into the low pressure container 62. Consequently, the operation of manual lever 59 results in a remote control of pump 2.

Control valve 45 is shifted to the control position II only when a predetermined lowest speed of rotation under load of the combustion engine 1 is exceeded. The valve slide of control valve 45 has negative overlapping, which results in an automatic return of wobble plate 3 of pump 2 to the neutral position when a minimum speed of combustion engine 1 is not reached. The position of manual control lever 59 is then without any influence on the volume displaced by the pump.

Throttles 68 and 69 serve for protecting the feeding pressure, in the event that auxiliary pump 50 is also used for assuring a minimum low pressure in a hydrostatic transmission with closed circulation. In the lower critical range of speed of combustion engine 1, pump 2 is set to a neutral position in which no fluid is pumped.

The check valve 51'' is adjusted to an opening pressure which is slightly greater than the differential pressure at which control valve 45 responds. At high rotary speed of the combustion engine 1, the differential pressure at the valve plate, not shown, would become very great which would result in a noticeable power loss. If the pressure at which the control valve responds is reached, and if the rotary speed of combustion engine 1 increases further, the check valve 51'' opens, and pressure fluid can flow through conduit 51' into conduit 69.

From the above description of a preferred embodiment of the invention it will become apparent that a control and regulating apparatus in accordance with the invention for regulating an adjustable pump driven by a combustion motor, comprises the following elements: first adjusting means 3, 13, 19, 25, 30–34 connected with said adjustable pump and movable in opposite directions for varying the volume of fluid displaced by said adjustable pump at the same speed; an auxiliary pump 50 driven at a speed proportional to the speed of said adjustable pump 2; high pressure delivery conduit means 49, 53, 67, 26 for said auxiliary pump 50; throttle means 51 in said delivery conduit means 49 responsive to a predetermined volume of fluid delivered by said auxiliary pump 50 at a predetermined speed to produce a predetermined pressure differential; speed control valve means 45 biassed to a normal inoperative position I, and being responsive to said predetermined pressure differential 41 to move to a control position II; second adjusting means 59 including shifting valve means 55, 56 having two reversing positions, and connecting 63, 64 said speed control valve means 45 in said control position II reversed with said delivery conduit means 53 and with a low pressure discharge space 62; and hydraulic setting means 36 to 43 for said first adjusting means 34 hydraulically connected by said speed control valve means 45 with said deliver conduit means 53 and said discharge space 62 and operating in said control position II of said speed control valve means said first adjusting means 34, 30, 13, 19 in opposite directions depending on said reversing positions of said shifting valve means whereby the adjustment of said adjustable pump 2 by direct operation of said first adjusting means 34 is overruled by said adjusting means 59 so that stalling of said motor 1 is prevented.

It will be understood that each of the elements described above, or two or more together, may also find a useful application in other types of hydraulic control and regulating apparatus differing from the types described above.

While the invention has been illustrated and described as embodied in a hydraulic control and regulating apparatus for an adjustable pump driven by a combustion motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Hydraulic control and regulating apparatus for an adjustable pump driven by a combustion engine, comprising first adjusting means connected with said adjustable pump and movable in opposite directions for varying the volume of fluid displaced by said adjustable pump at the same speed; an auxiliary pump driven at a speed proportional to the speed of said adjustable pump; high pressure delivery conduit means for said auxiliary pump; throttle means in said delivery conduit means responsive to a predetermined volume of fluid delivered by said auxiliary pump at a predetermined speed to produce a predetermined pressure differential; speed control valve means biassed to a normal inoperative position, and being responsive to said predetermined pressure differential to move to a control position; second adjusting means including shifting valve means having two reversing positions, and connecting said speed control valve means in said control position with said delivery conduit means and with a low pressure discharge space; and hydraulic setting means for said first adjusting means including setting conduit hydraulically connected by said speed control valve means with said delivery conduit means and said discharge space and operating in said control position of said speed control valve means said first adjusting means in opposite directions depending on said reversing positions of said shifting valve means whereby the adjustment of said adjustable pump by direct operation of said first adjusting means is overruled by said second adjusting means so that stalling of said engine is prevented.

2. Apparatus as claimed in claim 1 wherein said shifting valve means include two shifting valves each movable between an open and a closed position for reversing the flow of fluid through said speed control valve in said control position.

3. Apparatus as claimed in claim 1 wherein said adjustable pump includes a regulating means; and wherein said first adjusting means include a manually operable linkage connected with said regulating means and also operated by said setting means, an adjustment control valve shiftable by said linkage between an inoperative position and at least one operative position, and hydraulic operating motor means controlled by said adjustment control valve in said operative position to set said regulating means in accordance with the position of said linkage.

4. Apparatus as claimed in claim 1 wherein said second adjusting means include a manually operated member connected with said shifting valve means.

5. Apparatus as claimed in claim 1 wherein said adjustable pump has a high pressure outlet conduit; further comprising a throttle and a maximum volume limiting valve connected in parallel in said output conduit, said limiting valve being hydraulically connected with said first adjusting means and operating the same to reduce the volume discharged by said adjustable pump when said limiting valve responds to a predetermined pressure differential produced by said throttle at a maximum volume of fluid pumped through said outlet conduit.

6. Apparatus as claimed in claim 1 further comprising a check valve connected in parallel with said throttle means in said delivery conduit means of said auxiliary pump, and opening at a pressure higher than said pressure differential produced by said throttle means when the speed of said combustion engine and of said auxiliary pump rises after said speed control valve has moved to said control position.

7. Apparatus as claimed in claim 1 wherein said first adjusting means include a manual lever operatively connected with said adjustable pump for varying the displaced volume of fluid; wherein said hydraulic setting means include first and second hydraulic setting motors including spring biassed setting pistons abutting said manual lever from opposite sides.

8. Apparatus as claimed in claim 7 wherein said setting pistons form chambers in said setting motors; and comprising conduits connecting said chambers with ports of said speed control valve means, said speed control valve means having duct means, connecting said conduits with each other in said inoperative position, and with said shifting valve means in said control position.

9. Hydraulic control and regulating apparatus for an adjustable pump driven by a combustion engine, comprising first adjusting means connected with said adjustable pump and movable in opposite directions for varying the volume of fluid displaced by said adjustable pump at the same speed; an auxiliary pump driven at a speed proportional to the speed of said adjustable pump; high pressure delivery conduit means for said auxiliary pump; throttle means in said delivery conduit means responsive to a predetermined volume of fluid delivered by said auxiliary pump at a predetermined speed to produce a predetermined pressure differential; speed control valve means biased to a normal inoperative position, and being responsive to said predetermined pressure differential to move to a control position, said speed control valve means having two chambers connected with said delivery conduit upstream and downstream of said throttle means; second adjusting means including shifting valve means having two reversing positions, and connecting said speed control valve means in said control position with said delivery conduit means and with a low pressure discharge space; and hydraulic setting means for said first adjusting means hydraulically connected by said speed control valve means with said delivery conduit means and said discharge space and operating in said control position of said speed control valve means said first adjusting means in opposite directions depending on said reversing positions of said shifting valve means whereby the adjustment of said adjustable pump by direct operation of said first adjusting means is overruled by said second adjusting means so that stalling of said engine is prevented, said hydraulic setting means including first and second chambers, said setting conduits being connected with said chambers and having ports in said speed control valve means, said speed control valve means connecting said ports of said speed control valve means, said ports being connected with said delivery conduit means and with a low pressure discharge space in said control position of said speed control valve means.

10. Hydraulic control and regulating apparatus for an adjustable pump driven by a combustion engine, comprising first adjusting means connected with said adjustable pump and movable in opposite directions for varying the volume of fluid displaced by said adjustable pump at the same speed; an auxiliary pump driven at a speed proportional to the speed of said adjustable pump; throttle means in said delivery conduit means responsive to a predetermined volume of fluid delivered by said auxiliary pump at a predetermined speed to produce a predetermined pressure differential; speed control valve means biased to a normal inoperative position, and being responsive to said predetermined pressure differential to move to a control position, said speed control valve means including a cylinder, a valve slide in said cylinder movable between said normal inoperative position and said control position, spring means in said cylinder and biasing said valve slide to said inoperative position, said valve slide having two end chambers in said cylinder connected with said delivery conduit upstream and downstream of said throttle means; second adjusting means including shifting valve means having two reversing positions, and connecting said speed control valve means in said control position with said delivery conduit means and with a low pressure discharge space; and hydraulic setting means for said first adjusting means hydraulically connected to said speed control valve means with said delivery conduit means and said discharge space and operating in said control position of said speed control valve means said first adjusting means in opposite directions depending on said reversing positions of said shifting valve means whereby the adjustment of said adjustable pump by direct operation of said first adjusting means is overruled by said second adjusting means so that stalling of said engine is prevented, said hydraulic setting means including first and second cylinders, first and second setting pistons forming chambers in said cylinders, springs in said chambers biasing said setting pistons from opposite sides against said first adjusting means; said setting conduits including two setting conduits connected with said chambers, respectively, and having ports in said speed control valve means, said speed control valve means connecting said ports of said two setting conduits in said inoperative position of said speed control valve means, said ports being connected in said control position of said speed control valve means with said delivery conduit means and with a low pressure discharge space.

11. Apparatus as claimed in claim 10 wherein said adjustable pump includes a regulating means; and wherein said first adjusting means include a linkage connected with said regulating means and operated by said setting means, an adjustment control valve shiftable by said linkage between an inoperative position and at least one operative position, and hydraulic operating motor means controlled by said adjustment control valve in said operative position to set said regulating means in accordance with the position of said linkage; wherein said second adjusting means includes a manually operated lever connected with said shifting valve means; wherein said first adjusting means include a manual lever forming a part of said linkage; and wherein said setting pistons abut said manual lever of said first adjusting means.

* * * * *